United States Patent
Räsänen

(10) Patent No.: US 6,674,741 B1
(45) Date of Patent: Jan. 6, 2004

(54) HIGH SPEED DATA TRANSMISSION IN MOBILE COMMUNICATION NETWORKS

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/194,073

(22) PCT Filed: May 20, 1997

(86) PCT No.: PCT/FI97/00296

§ 371 (c)(1),
(2), (4) Date: Nov. 20, 1998

(87) PCT Pub. No.: WO97/44980

PCT Pub. Date: Nov. 27, 1997

(30) Foreign Application Priority Data

May 20, 1996 (FI) .................................................. 962127

(51) Int. Cl.⁷ ............................................... H04B 7/212
(52) U.S. Cl. ......................... 370/347; 370/468; 370/477
(58) Field of Search ................................. 370/321, 326, 370/328, 329, 347, 357, 442, 465, 467, 468, 473, 498, 536, 503, 513, 394, 476, 477; 358/400, 407, 409; 455/450, 509

(56) References Cited

U.S. PATENT DOCUMENTS

| | | | |
|---|---|---|---|
| 5,369,501 | * 11/1994 | Wilson et al. | 358/407 |
| 5,448,560 | * 9/1995 | Chen et al. | 370/465 |
| 5,491,565 | * 2/1996 | Naper | 358/468 |
| 5,648,967 | * 7/1997 | Schulz | 370/328 |

OTHER PUBLICATIONS

Decker et al, Performance Analysis of Fax Transmission On Non–Transparent GSM Data Service, IEEE, pp. 199–204, Dec. 1993.*
Dimolitsas et al, Group 3 Facsimile Transmission Over Digital Satellite Land Mobile Networks, IEEE, pp. 240–246, 1992.*
Hamling, An Overview of GSM Data Services, IEEE, pp. 1–8, Mar. 1995.*
Gagnaire et al, An Intelligent Hybrid Type–II ARQ/FEC Logical Link Control Protocol for GSM Mobile Communication System, IEEE, pp. 277–281, Jun. 1994.*

* cited by examiner

Primary Examiner—Seema S. Rao
Assistant Examiner—Frank Duong
(74) Attorney, Agent, or Firm—Pillsbury Winthrop LLP

(57) ABSTRACT

The invention relates to high speed data transmission in digital mobile communication systems. In multichannel data transmission, a single data connection is allocated a plurality of parallel traffic channels (Ch1, Ch2, Ch3) via which the data units (1, 2, . . . , n) are transferred. At the transmitter (Tx), the data units are provided with a numbering by means of which the receiver (Rx) is able to restore the transmission sequence of the data units received via the different traffic channels. If the length of the data units varies to a great extent or is small in relation to the transmission delay tolerance of the traffic channels, the number space of the data units must be large for the receiver to be able to restore the data unit sequence. An increase in the number of numbering bits signifies a lower efficiency for the transfer. In at least embodiment of the invention, short data units are concatenated in data blocks (I and II) each of which is transmitted as an entity via the traffic channel. In each data block, advantageously only one data unit is numbered.

9 Claims, 7 Drawing Sheets

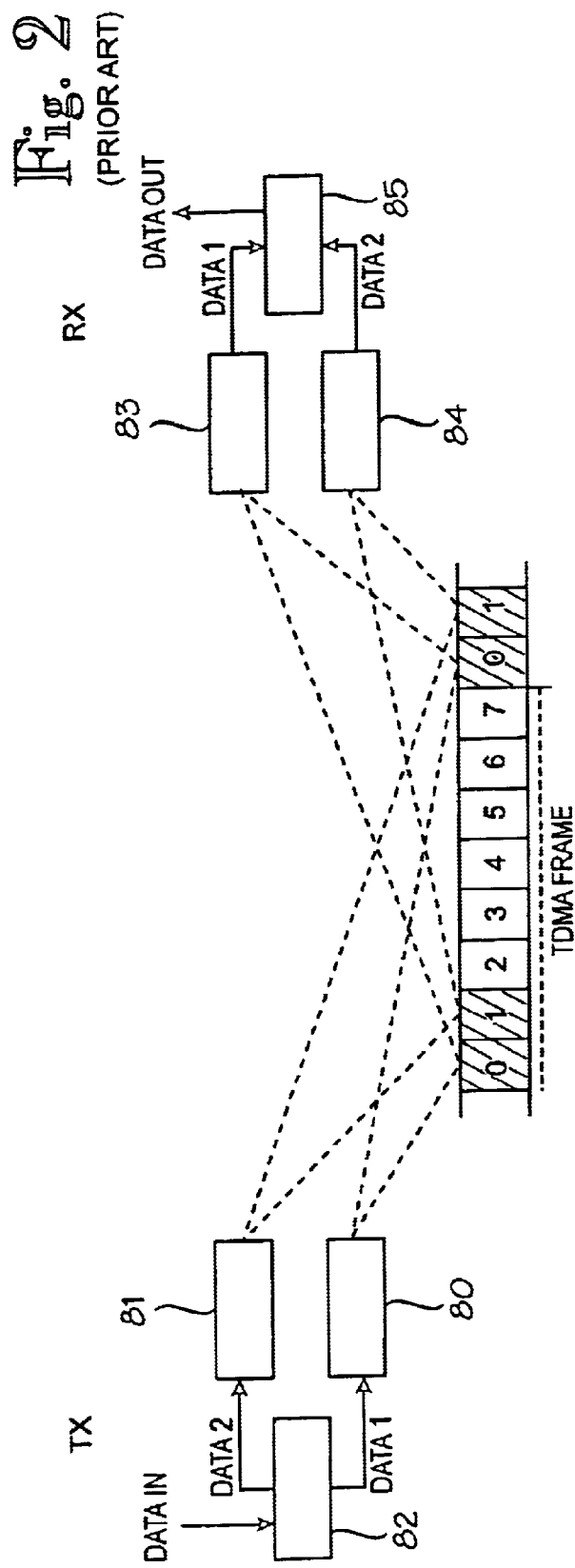
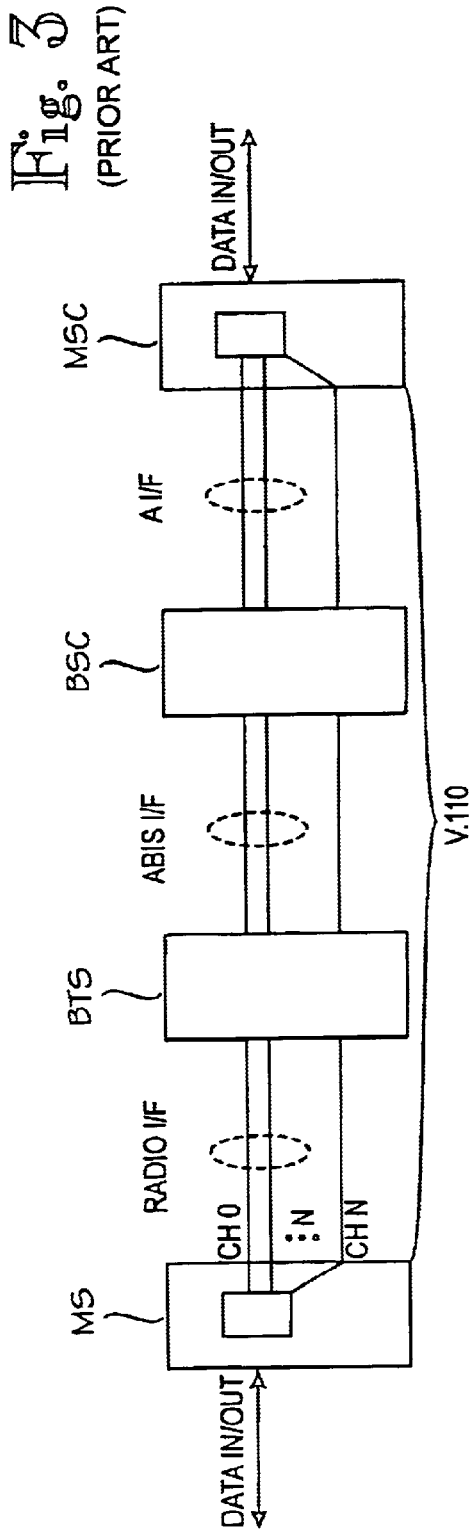

HIGH SPEED DATA TRANSMISSION IN MOBILE COMMUNICATION NETWORKS

FIELD OF THE INVENTION

The present invention relates to high speed data transmission in digital mobile communication networks.

BACKGROUND OF THE INVENTION

In mobile telecommunication systems of the time division multiple access (TDMA) type, time-division communication on the radio path takes place in successive TDMA frames, each of which consists of several time slots. In each time slot, a short information packet is sent as a radio frequency burst which has a finite duration and which consists of a set of modulated bits. The time slots are mainly used for transmitting control channels and traffic channels. On the traffic channels, speech and data are transmitted. On the control channels, signalling between a base station and mobile subscriber stations is carried out. An example of a TDMA radio system is the Pan-European mobile communication system GSM (Global System for Mobile Communications).

Other multiple access methods include code division multiple access (CDMA) and frequency division multiple access (FDMA). In a CDMA system, the channels are identified by spreading codes, and in FDMA systems each channel has a dedicated carrier frequency.

For communication in conventional mobile communication systems, each mobile station is assigned one traffic channel for data or speech transmission (single channel access). Thus, the GSM system, for instance, may have up to eight parallel connections to different mobile stations on a same carrier wave. The maximum data transmission rate on one traffic channel is restricted to a relatively low level according to the available bandwidth and the channel coding and error correction used in the transmission, for example in the GSM system to 9.6 kbit/s or 12 kbit/s. In the GSM system, a so-called half-rate (max. 4.8 kbit/s) traffic channel may be used for low rate data coding.

A high speed circuit switched data service HSCSD is currently being defined for digital mobile communication systems. HSCSD is based on parallel use of more than one traffic channel for a single data call. A high speed data signal is divided at the transmitting end into the parallel traffic channels (subchannels) for the duration of the transfer, and combined at the receiving end. In this manner it is possible to offer data transmission services in which the transmission rate is, depending on the number of allocated traffic channels, up to eight times the usual transfer rate. In the GSM system, for example, two parallel traffic channels will provide a transfer rate of 2×9.6 kbit/s, which is enough for a 14.4 kbit/s modem or a facsimile terminal. Six parallel traffic channels enable a transfer rate as high as 64 kbit/s. Such multichannel data transmission is described e.g. in WO95131878.

However, the use of parallel traffic channels has produced a problem concerning how to divide the data stream between parallel traffic channels and how to synchronize the combining of the data received from the parallel traffic channels. The above is caused by the fact that the data units, such as data frames, may be received from the subchannels in a different order than in which they were transmitted because the transmission delays on the different subchannels are not necessarily equal. For the receiving party to be able to restore the correct sequence of the data received from the subchannels, the data units must be numbered. One of such numbering mechanisms is disclosed in WO96/18248.

It is characteristic to the HSCSD solutions being developed that the data units transferred in the subchannels have a fixed length. For example, in a non-transparent service of the GSM system the data unit is a 240-bit RLP frame according to the radio link protocol (RLP). In a transparent service of the GSM system, the data unit is a stripped ITU-T V.110 frame. The user data, e.g. facsimile codes, are packed in the information field of the RLP frames, or in bits reserved for user data in the V.110 frame. In the non-transparent case, the receiving party organizes the data received from the subchannels into the correct order on the basis of the RLP frame numbers. In the transparent case, numbering related to the data units and/or subchannels is used. Transfer of fixed length data units over a three-channel transmission link (ch1, ch2, ch3) using frame numbering 1–6 is shown by FIG. 4.

In some cases it is necessary to optimize the data units so as to utilize the speed of the radio interface as efficiently as possible for transfer of user data. For example, a transparent service in the GSM system may have to abandon the V.110 frame structure for the sake of higher user data rate. This means that the statuses of the terminal equipment interface and the HSCSD control information (e.g. numbering of data units) has to be transferred in redundant parts of the user data. This easily results in that the data units transferred in the subchannels vary in length. Transfer of variable length data units over a three-channel transmission link is shown in FIG. 5.

A problem encountered here is that while transferring a maximum length data unit via one subchannel there is time to transfer a large number of short data units via the other subchannels. For the receiving party to be able to restore the correct order of the data units received from the subchannels, the number space used for numbering the data units (numbering bits) must be large enough. A drawback here is that as the number of numbering bits increases the number of user data bits decreases; in other words, the efficiency of the transfer is impaired.

Short data units also cause other problems. If the transmission delay of parallel subchannels is unequal and the data units are short in comparison with the transmission delay tolerance (e.g. if the data unit has a length smaller than twice the transmission delay tolerance), the receiving party's ability to restore the correct order of the data units has to be ensured by expanding the number space of the data units. Again, this deteriorates the transfer efficiency.

SUMMARY OF THE INVENTION

It is the object of the invention to improve the efficiency of data transmission when transmitting variable length or short data units through parallel traffic channels.

The invention relates to a method for high speed data transmission in a digital mobile communication system, the method comprising the following steps:

allocating at least two parallel traffic channels to a mobile station, providing the data units with a sequence numbering at the transmitting end, transmitting the data units provided with the sequence numbering to the receiving end via the allocated traffic channels, restoring, at the receiving end, the sequence of the data units to match said sequence numbering. The method according to the invention is characterized by concatenating short data units in data blocks,
transmitting each data block as a whole via the traffic channel.

In the invention, successive short data units are concatenated to form data blocks that are transmitted as a whole (without splitting) via a subchannel when the data units are of a variable length or when the data units are short in comparison with the maximum difference between transmission delays of parallel traffic channels. In case the data units vary in length, the long ones are transmitted without concatenation, provided with a dedicated data unit number. The data block advantageously has a length of approximately the same magnitude as the long data units so that the entities being transferred would have the same length as closely as possibly. On the other hand, from the point of view of transmission delays, it is advantageous to build the data blocks as long as possible to eliminate or minimize the effects on the number space of the difference between the transmission delays on the parallel subchannels. The number space required is also decreased by shortening the code word used for the numbering. This consequently improves the efficiency as the number of overhead bits transferred decreases.

In the preferred embodiment of the invention the data block is assigned a single data unit number. The receiving party may identify the borders between data blocks for example by the first data unit in each data block containing the data unit number of the data block. In case the data block contains successive data units, the data units will automatically be positioned in the correct sequence at the receiving end. The number space required will decrease and hence the code word employed for numbering is further shortened. As the data unit number is transferred in a concatenated data block just once, and not separately in each data unit of the block, the number of overhead bits transferred further decreases.

In the second embodiment of the invention, each data unit in a data block contains a data unit number. This results in that it is not strictly compulsory to concatenate successive data units into the data block. However, the number of bits to be transferred in this embodiment is higher than in the previous embodiment.

BRIEF DESCRIPTION OF THE DRAWINGS

In the following, the invention will be described in closer detail with reference to the accompanying drawings in which FIG. 2 illustrates high speed data transmission in two TDMA timeslots on the radio path, FIG. 3 illustrates a network architecture supporting high speed data transmission over a plurality of traffic channels between a mobile station MS and a network adapter IWF in the GSM system.

THE PREFERRED EMBODIMENTS OF THE INVENTION

The invention is applicable to any mobile communication system which supports multichannel data transmission between a mobile station and mobile communication network. The mobile communication system and its channel structure may be based on any multiple access method, such as TDMA, CDMA or FDMA.

The present invention is particularly well suited for data transmission applications in the Pan-European digital mobile communication system GSM (Global System for Mobile Communications), and in other GSM-based systems such as DCS1800 (Digital Communication System) and the U.S. digital cellular radio system PCS (Personal Communication System). The invention will below be described by using the GSM system as an example. The structure and operation of the GSM system are well known for a person skilled in the art, and are defined in the ETSI (European Telecommunications Standards Institute) GSM specifications. In addition, reference is made to "GSM System for Mobile Communication", M. Mouly and M. Pautet, Palaiseau, France, 1992, ISBN: 2-9507190-0-7.

Another implementation is found in a combination of e.g. a GSM-based mobile communication system and a satellite system, like Inmarsat-P, connected thereto as a "base station arrangement".

Figure 1:
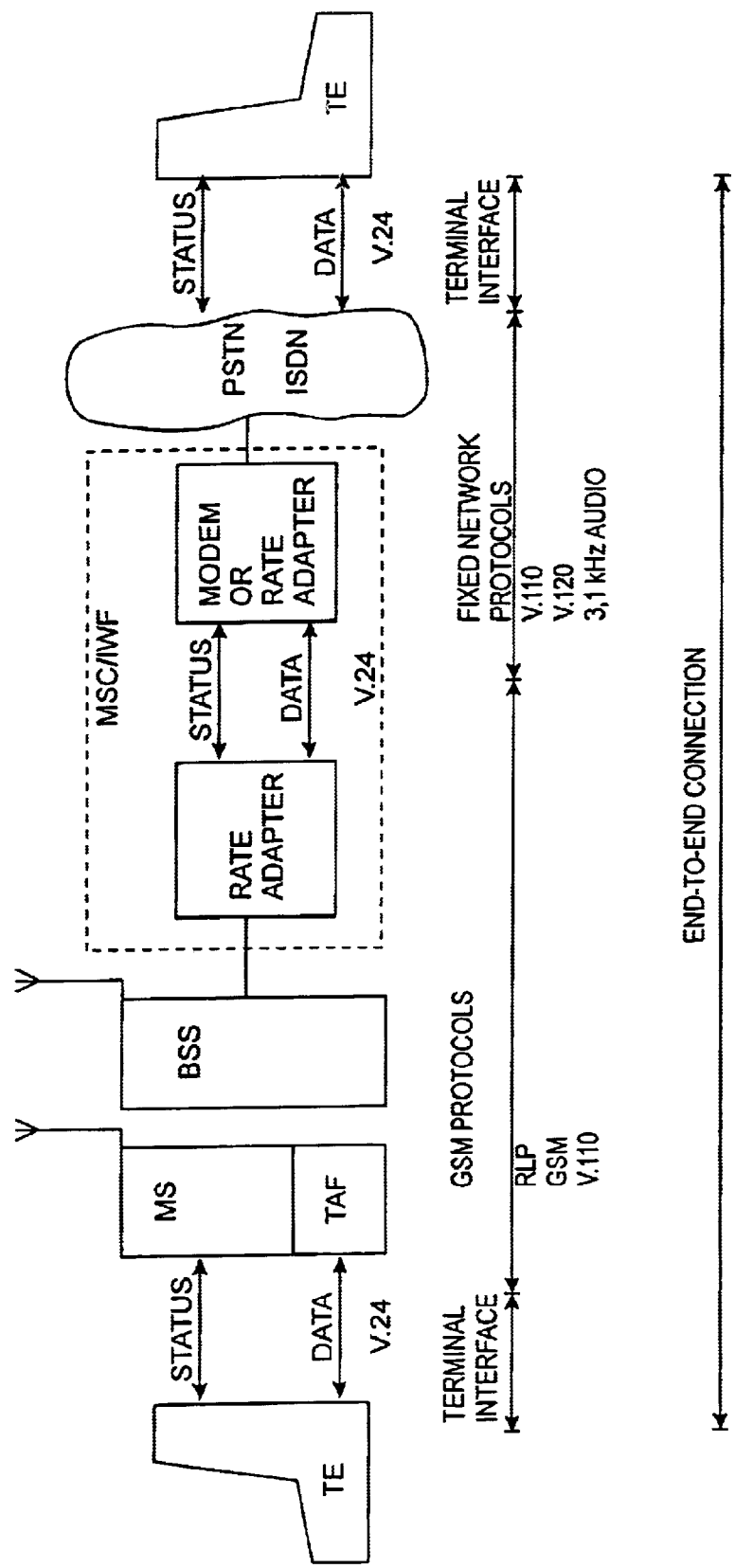
FIG. 1 illustrates in block diagram form a configuration according to the GSM recommendations for data transmission.

The basic structure of the GSM system is illustrated by FIG. 1, and it consists of two parts: a base station system BSS and a network sub-system (NSS). The BSS and the mobile stations MS communicate over radio connections. In the BSS, each cell is served by a base station BTS. A group of base stations is connected to a base station controller BSC, whose purpose is to control the radio frequencies and channels used by the BTS. The BSCs are connected to a mobile services switching center MSC. Specific MSCs are connected to other telecommunication networks, such as the PSTN, and comprise gateway functions for calls to and from these networks. These MSCs are known as gateway MSCs (GMSC).

Still referring to FIG. 1, a data link is established in the GSM system between a mobile station MS network terminal TAF (Terminal Adaptation Function) and a network adapter IWF (Interworking Function) in the mobile communication network. In the GSM network, the data link in data transmission is a V.110 rate adapted, V.24 interface compatible, UDI coded digital Full Duplex connection. In this connection, the V.110 connection is originally a digital transmission channel developed for ISDN (Integrated Services Digital Network). The transmission channel adapts to the V.24 interface and also provides a possibility for transfer of V.24 statuses (control signals). The CCITT recommendation for a V.110 rate-adapted connection is specified in the recommendation CCITT Blue Book: V.110. The CCITT recommendation for a V.24 interface is disclosed in the CCITT Blue Book: V.24. The TAF adapts a data terminal TE connected to the MS for said GSM V.110 data connection which is established over a physical connection using one or more traffic channels (HSCSD). The IWF comprises a rate adapter which adapts the GSM V.110 data connection to the V.24 interface, and a data modem or another rate adapter depending on whether the connection is to be established further to the PSTN or ISDN. The ISDN network protocols may be e.g. V.110 or V.120. In the ISDN or PSTN network, the data connection is established to e.g. a second data terminal TE. Here, the V.120 interface between the MS and TE is referred to as a terminal interface. The IWF also has a similar terminal interface, and so does the second data terminal TE in the ISDN or PSTN network. The protocol used between the terminal equipments TE may be e.g. an HDLC protocol according to the ITU-T recommendation X.25, or in a facsimile transfer a protocol according to ITU-T T.30.

The GSM traffic channel supports data transmission at user rates 300, 1200, 1200/75, 2400, 4800, 7200 and 9600 bit/s. In the future, high speed data services (HSCSD=High speed circuit switched data), which use two or more traffic channels at the radio interface (multi-slot access), will also support higher user rates (14400 bit/s, 19600 bit/s . . . ). In the future it will also be possible to raise the user data rate of a single channel by optimizing channel coding and/or rate adaptations. In addition to user data, the V. 110 frames also transfer, in both directions, status information of the terminal equipment interface (control signals of the V.24 interface), such as CT105 (RTS=request to send), CT108 (DTR=data terminal ready), CT106 (CTS=clear to send), CT107 (DSR=data set ready) and CT109 (CD=Data carrier detect). In addition, it is necessary in a multichannel transparent HSCSD data service to transfer inter-subchannel synchronization information, as will be disclosed in more detail below. On the traffic channel, channel coding is employed with the aim to reduce the effects of transmission errors. Channel coding and the aforementioned additional information will raise the bit rate at the radio interface higher than the actual user rate. The radio interface rates corresponding to the user. rates of 2400 and lower, as well as 4800 and 9600 bit/s, are 3600, 6000 and 12000 bit/s.

In conventional mobile communication systems, each mobile station is assigned one traffic channel for data or speech transmission.

In multichannel high speed circuit switched data transmission (HSCSD), two or more parallel traffic channels are allocated on the radio path for the data connection. The applicant's copending PCT application WO95/31878 discloses an arrangement in which a mobile station MS that requires data transmission at a higher rate than one traffic channel can offer is assigned two or more timeslots in the same TDMA frame. For closer details of the procedure, reference is made to the patent application in question. The channel structures employed at the GSM radio interface are disclosed in more detail in the GSM/ETSI recommendation 05.02.

In the following, with reference to FIG. 2, the procedure will be described as just one of the many ways to carry out high speed data transmission based on a number of parallel traffic channels in a radio system. However, it should be noted that from the point of view of the present invention the only matter bearing significance is that a data link comprising several parallel traffic channels has been established. The traffic channels may thus be based on other multiple access methods as well, such as CDMA and FDMA.

FIG. 2 shows an example in which a mobile station MS is assigned successive timeslots 0 and 1 in the same TDMA frame. A high speed data signal DATAIN that is to be transmitted over the radio path is split in a data splitter 82 into a required number of lower speed data signals DATA1 and DATA2. For each lower speed data signal DATA1 and DATA2, channel coding, interleaving, burst formatting and modulation 80 and correspondingly 81 are performed separately, after which each data signal is transmitted as a radio frequency burst in its dedicated timeslot 0 and correspondingly 1. As soon as the lower speed data signals DATA1 and DATA2 have been transferred separately over the radio path, demodulation, deinterleaving and channel decoding 83 and correspondingly 84 are performed separately for them at the receiving end, after which the data signals DATA1 and DATA2 are combined in a combiner 85 into the original high speed signal DATAOUT.

FIG. 3 is a block diagram illustration of the equipment configuration for the GSM system, implementing such a data transmission employing a multitude of parallel traffic channels. The operations of the blocks 80, 81, 83 and 84 in FIG. 3, in other words channel coding, interleaving, burst formatting and modulation, and correspondingly demodulation, deinterleaving and channel decoding are located at the fixed network side, advantageously at the base station BTS. The TDMA frame described above is thus transmitted between the BTS and the MS at the radio interface Radio I/F. The BTS has a separate parallel handling for each timeslot. Instead, the splitter 82 and the combiner 85 of FIG. 2 may be located in the fixed network separate from the base station BTS in another network element, whereby the lower speed data signals DATAL and DATA2 are transferred between the network element mentioned and the base station like signals on normal traffic channels. In the GSM system, this communication takes place between the BTS and a special Transcoder/Rateadapter Unit TRCU in TRAU frames according to the ETSI/GSM recommendation 08.60. As to the invention, the TRAU frames and transfer related thereto are not significant, because the invention relates to carrying out and synchronizing data transmission over the entire data link which uses several parallel traffic channels, in other words, between the splitter 82 and the combiner 85.

The high speed data stream DATAIN must be split in parallel transparent traffic channels so that it may be combined at the receiving end. The applicant's copending PCT application WO96/18248 discloses a solution in which the data units are at the transmitting end Tx provided with frame and/or channel numbering with the aid of which the data units can be combined back in their original sequence at the receiving end Rx.

Figure 4:
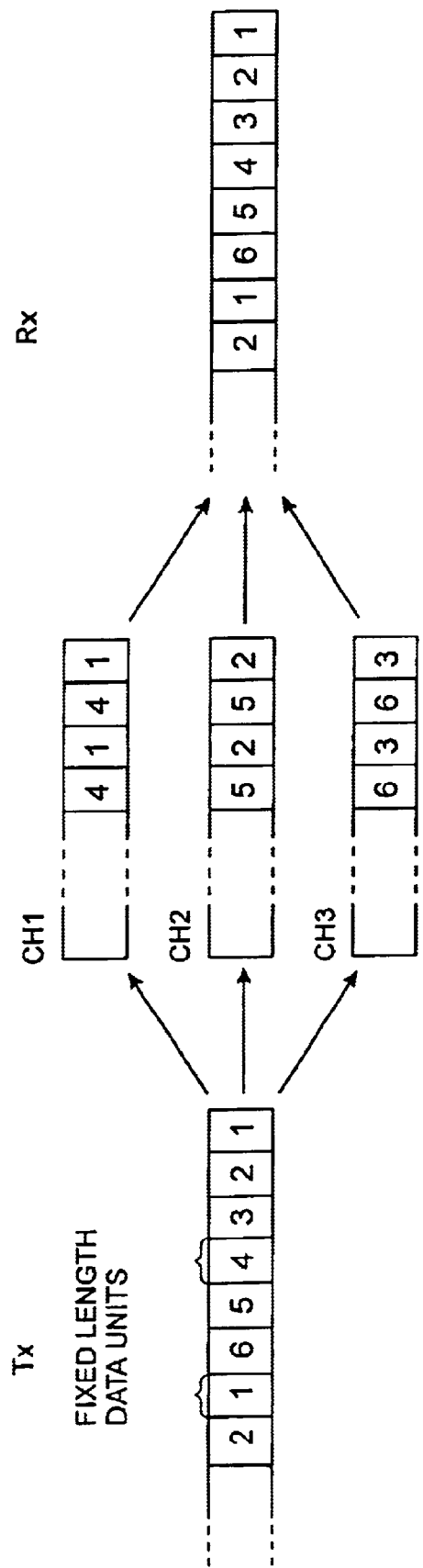
FIGS. 4 and 5 illustrate, respectively, splitting equal length and variable length data units at the transmitting end Tx to a number of parallel traffic channels ch0–ch3 and combining them at the receiving end Rx.
Figure 5:
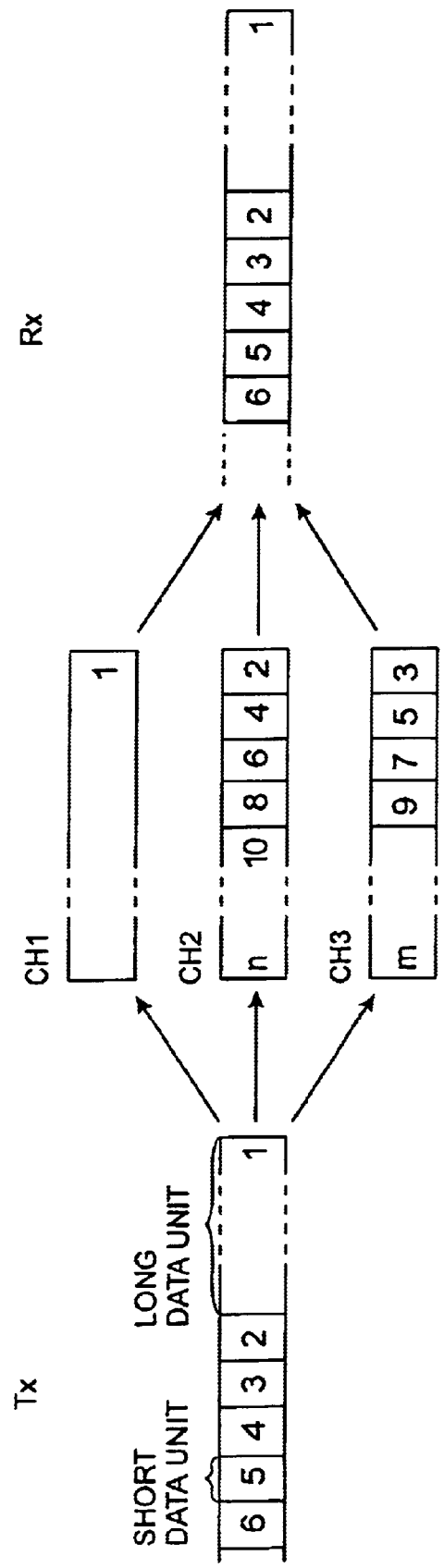

Conventionally, the data units such as V.110 or RLP frames have been of fixed length, as disclosed in connection with FIG. 4. In such a case, the numbering of the data units causes no particular problems. In some special cases, the data units may vary in length or they may be very short, as illustrated by FIG. 5, whereby the numbering of the data units will also be associated with problems such as described above.

There are plenty of situations in which the data units are of fixed length or very short. An example of such a situation is the new channel type of the GSM system, being developed to offer a user rate of 14400 bit/s. The likely implementation is based on a 14400 bit/s radio interface rate, which means optimizing the frame structures on the radio path. As to transparent data services, this means that the use of V.110 frames as data units must be abandoned entirely. As a result, the statuses of the terminal equipment interface and the numbering bits of the parallel traffic channels in the HSCSD have to be transferred in the redundant parts of the user data. When a facsimile service is using a normal facsimile data mode (NFD) according to the recommendation T.30, the data units according to the invention may be facsimile code lines and the redundant parts may be fill bits of the code line. Consequently, the data units, i.e. the facsimile lines, may vary in length, as will be described below in more detail.

The fixed length or variable length data units may be considered as short in relation to the transmission difference at least in cases the data unit is shorter than approximately $2*T_{dif}$ where $T_{dif}$ is the maximum difference between transmission delays of parallel traffic channels (in other word, the transmission delay tolerance).

One of the most important services in mobile communication systems is a facsimile service. The transparent facsimile service of the GSM system is defined in the GSM recommendation 03.45. In the facsimile service, there is defined between the facsimile terminal (FAX) and the MS a specific facsimile adapter. The equipment configuration required is specified in the recommendation GSM 03.45, the details of which have no significance to the invention. In FIGS. 1, 3, 4 and 5 it may be assumed that the FAX and the facsimile adapter are included in the terminal equipment TE and that the terminal equipment interface is the V.24 interface between the facsimile adapter and the MS.

Figure 6:
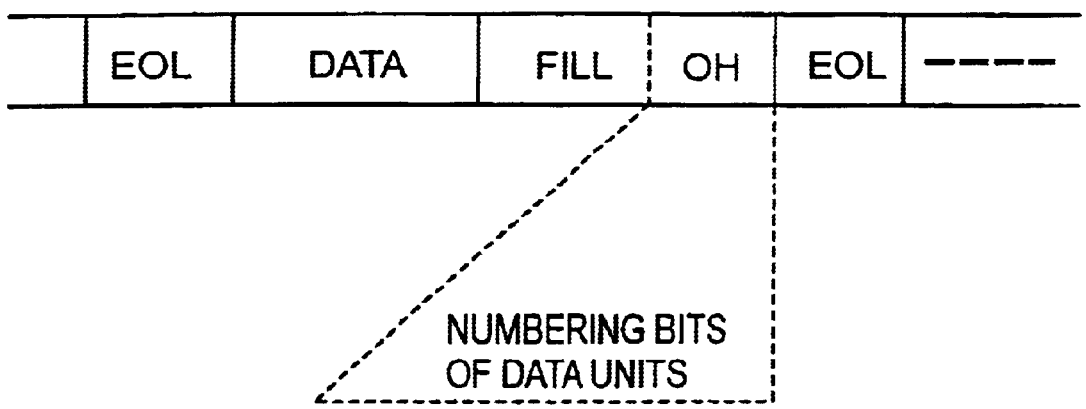
FIG. 6 illustrates a FILL field modified according to the invention in a normal facsimile data mode NFD.

When the facsimile service employs the normal facsimile data mode (NFD) according to the T.30 recommendation, the data to be transferred contains End_Of_Line marks (EOL), facsimile-coded data DATA and possible fill bits FILL to ensure the minimum line length defined, as illustrated by FIG. 6. Such fill bits may be considered as redundant as far as the transfer is concerned and utilized in the present invention. FIG. 6 illustrates how the status information of the terminal interface and the numbering of the data units may be placed at the end of the facsimile-coded lines to replace some of the FILL bits. For example, 1-n bits may be used for numbering the data units and for the possible transfer of the terminal interface status information.

The FILL bits described above are not, however, usually present in all the facsimile code lines in the NFD mode. This is because the lines are long enough due to the data, and no fill bits are required. It is even possible that the whole facsimile page has no fill bits FILL at all. This may lead into having to add fill bits in a line only due to transferring numbering information according to the invention. As a consequence, the amount of data to be transferred over the radio path increases. However, as facsimile terminals switch over from data mode to signalling mode every time after having transmitted a page, the situation may be handled easily by buffering data to the transmission buffer of the transmitting facsimile adapter (TAF or IWF) during transmission of a page. The contents of the transmission buffer are emptied at the end of transmitting a page, before the facsimile terminals acknowledge the transfer of the page according to the ITU-T T.30 protocol. The ITU-T T.30 offers little time for such an extra buffer emptying operation. If the number of numbering bits added is too high, the call will not succeed due to the end handshaking of the page and the emptying of the transmission buffer overlapping.

The length of lines facsimile-coded according to ITU-T T.4 may vary from a couple of bits to thousands of bits. In the worst of situations, a picture to be transferred contains maximum and minimum length lines mixed. When a facsimile-coded line having the maximum length is transmitted to a subchannel of a multichannel data link, there is simultaneously time to send a large number of minimum length facsimile-coded lines in the other subchannels. This corresponds to transferring data units of varying lengths, which is illustrated by FIG. 5, with each facsimile-coded line being examined as one data unit. As described above, the number space of the line numbering or data unit numbering must be large enough in order for the receiving end to be able to restore the correct order of the facsimile-coded lines.

Figure 7:
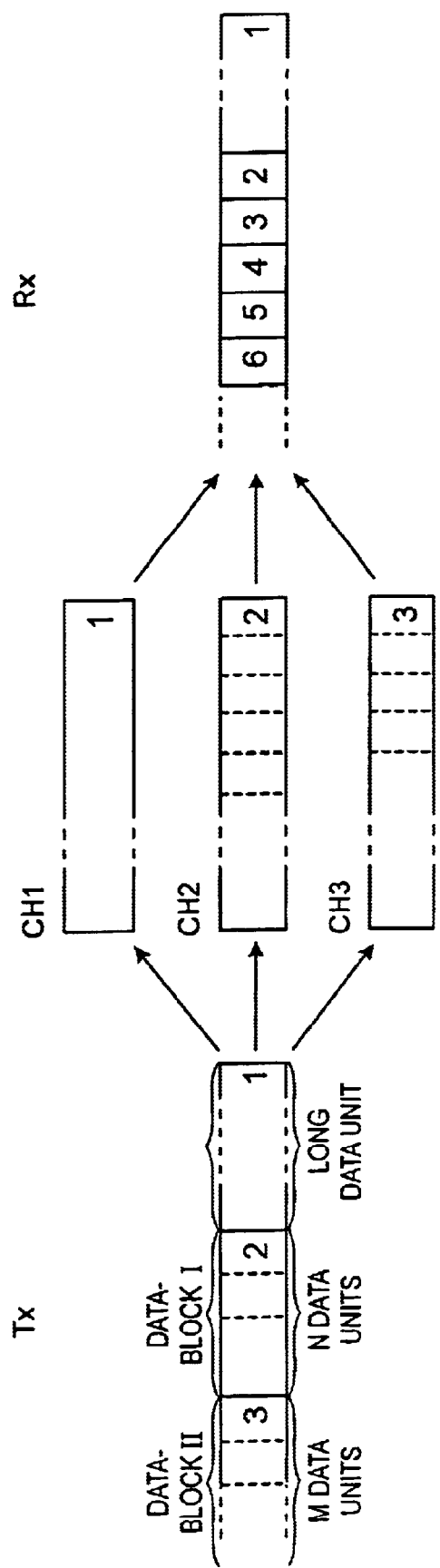
FIG. 7 illustrates splitting variable length data units at the transmitting end Tx to a number of parallel traffic channels ch0–ch3 and combining them at the receiving end Rx.

FIG. 7 illustrates the inventive transfer of data units. In the invention, successive short data units are concatenated to form a data block which is transmitted as a whole (without splitting) via one subchannel. For example, block I in FIG. 7 consists of N data units, and it is transmitted as a single entity via subchannel ch2. Correspondingly, block II consists of M data units, and it is transmitted as a single entity via subchannel ch3. Long data units are transmitted without concatenation, provided with a dedicated data unit number. For example, data unit 1 in FIG. 7 is a long data unit which is transmitted alone via the subchannel ch1.

The length of the data block is advantageously of the same magnitude as that of the long data units in order for the entities to be transferred to have an equal length as closely as possibly. On the other hand, it is advantageous to build the data blocks as long as possible to be able to eliminate or minimize the effect on the number space of the difference of transmission delays on the parallel subchannels. The number space is decreased by making the code word used for the numbering shorter. This also improves efficiency due to a smaller number of overhead bits to be transferred.

In the preferred embodiment of the invention, shown by FIG. 7, the data block is assigned one data unit number only. For example, block I is assigned the data unit number 2 and block II the data unit number 3. The receiving party may identify the boundaries of the data block e.g. from the first data unit (the one furthest to the right in FIG. 7) in the data block containing the data unit number of the data block. In case the data block contains successive data units, the data units will automatically be arranged in the correct sequence at the receiving end Rx. The number space required decreases and consequently the code word used for the numbering further shortens. As the data unit number is transferred in a concatenated data block only once, and not separately in each data unit of the block, the number of overhead bits to be transferred further decreases.

In the second embodiment of the invention, each data unit in each data block contains a data unit number. Thus, each of the N data units of data block I in FIG. 7 would contain a dedicated data unit number. Consequently, the data units concatenated in the data block need not necessarily be in succession as the sequence of the data units is indicated by data unit numbering within the block as well. In this embodiment, however, the number of bits to be transferred is higher than in the previous embodiment. The transfer of the block in FIG. 7 requires N−1*NB bits more if every data unit is provided with a data unit numbering (NB denotes the number of bits in a data unit number).

Figure 8:
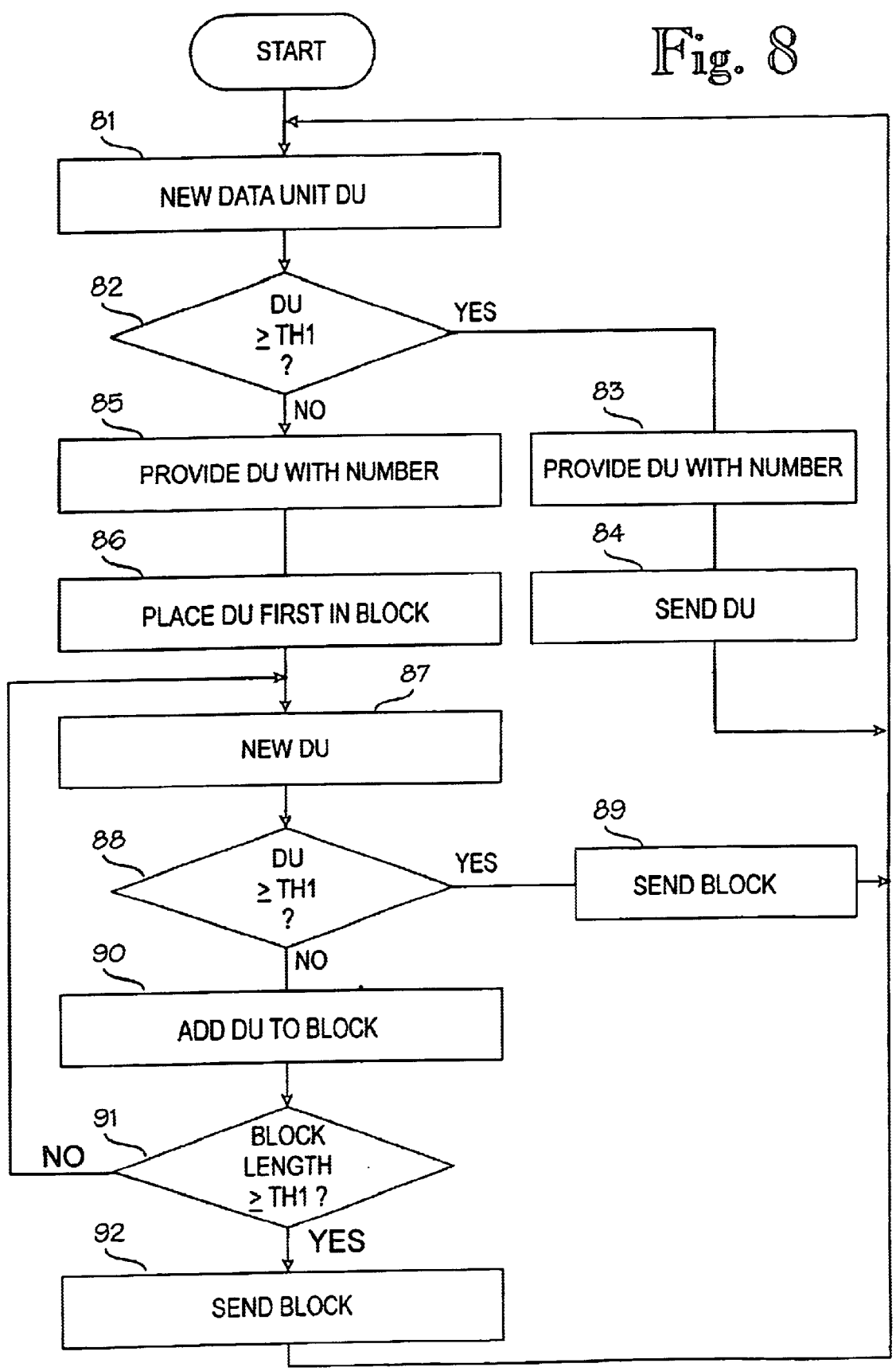
FIG. 8 is a flow chart illustrating a transmission method according to the invention.

The flow chart of FIG. 8 illustrates a way according to the invention for classifying data units according to their length and concatenating short data units in blocks.

At step 81, a new data unit DU is received for transmission e.g. from the terminal equipment interface to the TAF. Following this, it is checked whether the DU is shorter or equal in length (e.g. number of bits) compared to a predetermined threshold value TH1 for the length of the data unit (step 82). If that is the case, the DU is classified as long and it is assigned a data unit number at step 83, after which the DU is sent alone to one of the subchannels at step 84. Then, the procedure returns to step 81.

If the DU is shorter than the threshold value TH1 at step 82, the DU is classified as short and frame formatting begins. At first in step 85, the DU is assigned a data unit number, after which the DU is placed to the initial position in the block.

Then, a new DU is received to be concatenated (step 87). After this, it is checked whether the DU length is greater than or equal to the predetermined threshold value TH1 predetermined for the facsimile line (step 88). If it is, the DU is classified as long and frame formatting is not continued. In such a case, the block already formed, which contains at least one DU, is transmitted to one of the subchannels (step 89).

If the length of the DU is smaller than TH1 at step 88, the DU is classified as short and frame formatting is continued. At step 90, the DU is added to the final position in the block. Then at step 91, it is checked whether the block length (e.g. as bits) is greater than TH1. If that is the case, the block is considered as long enough and frame formatting is not continued. In such a case, the block already formed, which contains at least two concatenated DUs, is transmitted to one of the subchannels (step 92). This is followed by the procedure returning to step 81.

If the block is shorter than TH1 at step 91, the block is still too short, and frame formatting continues. In such a case, the process proceeds to step 87 to handle a new data unit to be concatenated.

The figures and the description related thereto is only intended to illustrate the present invention. In details the invention may vary within the spirit and scope of the attached claims.

What is claimed is:

1. A method for high speed data transmission in a digital mobile communication system, comprising allocating at least two parallel traffic channels to a mobile station, classifying the data units to relatively longer and relatively shorter data units, transmitting, separately, each of said longer data units provided with a sequence number, concatenating said shorter data units in data blocks whose length is of the same magnitude as that of said longer data units, providing the data block with one sequence number or providing each data unit of the data block with a dedicated sequence number, transmitting each data unit as a whole via one of the allocated traffic channels, and restoring, at the receiving end, a sequence of the data units to match said sequence numbers.

2. A method as claimed in claim 1, comprising concatenating short data units in data blocks when the data to be transferred are in data units of varying lengths.

3. A method as claimed in claim 1, comprising concatenating short data units in data blocks when the data to be transferred is in the form of data units having a fixed length which is short in relation to a maximum difference between transmission delays of the allocated traffic channels.

4. A method as claimed in claim 1, comprising concatenating said data units in data blocks which are as long as possible in relation to a transmission delay difference of the allocated traffic channels.

5. A method as claimed in claim 1, wherein the data unit is a facsimile code line according to ITU-T T.30 and that the data unit numbering is inserted in the fill bits of the facsimile line.

6. A digital mobile communication system in which a mobile station and a fixed mobile communication network comprise a data transmitter and a data receiver which are capable of data transmission to the mobile station over a radio path on two or more traffic channels allocated to the mobile station, and wherein the data transmitter is configured to transmit a high speed data signal as data units, the data transmitter is configured to classify the data units to relatively longer and relative shorter data units, the data transmitter is configured to transmit, separately, each of said longer data units provided with a sequence number, the data transmitter is configured to concatenate said shortr data units in data blocks, the data transmitter is configured to provide the data block with one sequence number or to provide each data unit of the data block with a dedicated sequence number, the data transmitter is configured to transmit each data block as a whole via one of the traffic channels, and the receiver is configured to restore a sequence of the data units to match said sequence numbers.

7. A system claimed in claim 6, wherein the data units are short in relation to a maximum difference between transmission delays of the allocated traffic channels.

8. A system as claimed in claim 6, wherein the data unit is a facsimile code line according to ITU-T T.30, and wherein a data unit numbering is inserted in the fill bits of the facsimile line.

9. A system as claimed in claim 6, wherein the data units vary in length.

* * * * *

UNITED STATES PATENT AND TRADEMARK OFFICE
CERTIFICATE OF CORRECTION

PATENT NO. : 6,674,741 B1
DATED : January 6, 2004
INVENTOR(S) : Räsänen

It is certified that error appears in the above-identified patent and that said Letters Patent is hereby corrected as shown below:

Title page,
Item [56], References Cited, FOREIGN PATENT DOCUMENTS, please add the following:
-- WO   WO 95/31878   11/1995
   WO   WO 96/18248   6/1996 --
OTHER PUBLICATIONS
-- Mouly et al., "The GSM System for Mobile Communications," International Standard Book Number: 2-9507190-0-7, 1992, pp. 7-699.

"Support of Data Terminal Equipments with V-Series Type Interfaces by an Integrated Services Digital Network", International Telecommunication Union, V. 110, September 1992, p. 1-58.

"Support by an ISDN of Data Terminal Equipment with V-Series Type Interfaces with Provision for Statistical Multiplexing," International Telecommunication Union, V. 120, September 1992, pp. 1-36.

"List of Definitions for Interchange Circuits Between Data Terminal Equipment (DTE) and Data Circuit-Terminating Equipment (DCE)", International Telecommunication Union, V. 24, March 1993, pp. 1-13.

"Procedures for Document Facsimile Transmission in the General Switched Telephone Network", International Telecommunication Union, T. 30, March 1993, pp. 1-156.

"European Digital Cellular Telecommunications System (Phase 2): Multiplexing and Multiple Access on the Radio Path (GSM 05.02)", European Telecommunications Standards Institute, ETS 300 574, September 1994, pp. 1-36.

"European Digital Cellular Telecommunications System (Phase 2): Full Rate Speech Transcoding (GSM 06.10)", ETS 300 580-2, European Telecommunications Standards Institute, September 1994, pp. 1-70.

"European Digital Cellular Telecommunications System (Phase 2): Technical Realization of Facsimile Group 3 Transparent (GSM 03.45)", European Telecommunications Standards Institute, pr. ETS 300 538, May 1995, pp. 1-46.

UNITED STATES PATENT AND TRADEMARK OFFICE
CERTIFICATE OF CORRECTION

PATENT NO. : 6,674,741 B1
DATED : January 6, 2004
INVENTOR(S) : Räsänen

It is certified that error appears in the above-identified patent and that said Letters Patent is hereby corrected as shown below:

<u>Title page (cont'd),</u>
"Digital Cellular Telecommunications System (Phase 2+): Inband Control of Remote Transcoders and Rate Adaptors for Enhanced Full Rate (EFR) and Full Rate Traffic Channels (GSM 08.60 version 5.1.0)", pr ETS 300 737, European Telecommunications Standards Institute, pp. 1-35. --

Signed and Sealed this

First Day of June, 2004

JON W. DUDAS
*Acting Director of the United States Patent and Trademark Office*